April 4, 1944.  R. T. COFFMAN  2,345,917
INJECTION MOLDING OF PLASTICS
Filed Oct. 4, 1941  2 Sheets-Sheet 1
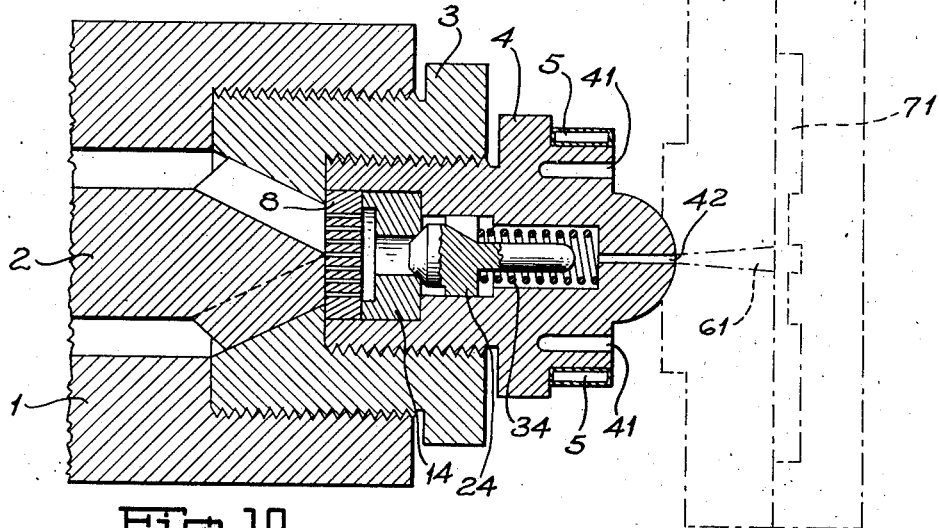
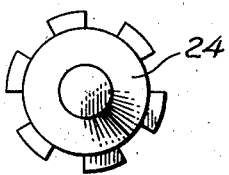
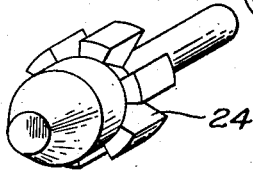
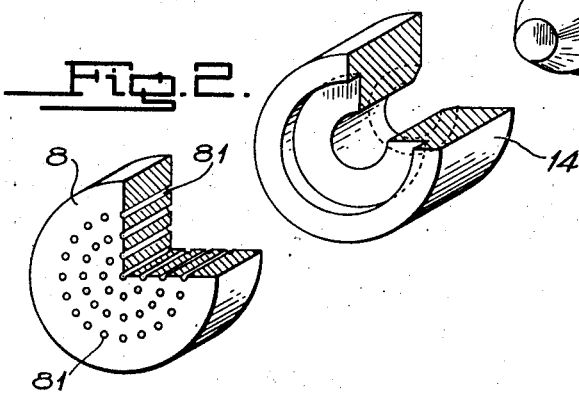
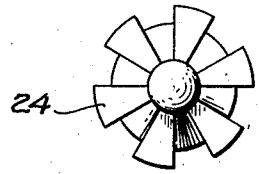
INVENTOR.
Raphael T. Coffman
BY
ATTORNEY April 4, 1944.   R. T. COFFMAN   2,345,917
INJECTION MOLDING OF PLASTICS
Filed Oct. 4, 1941   2 Sheets-Sheet 2
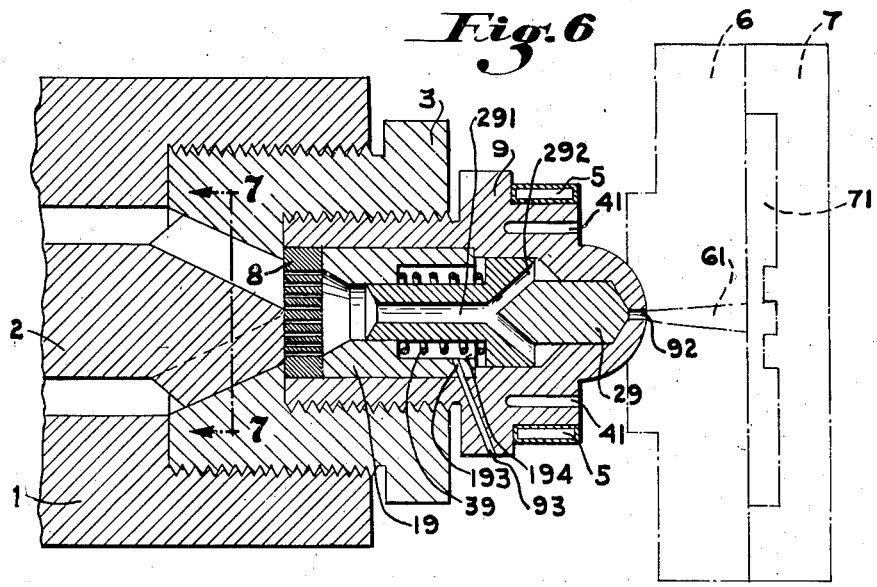
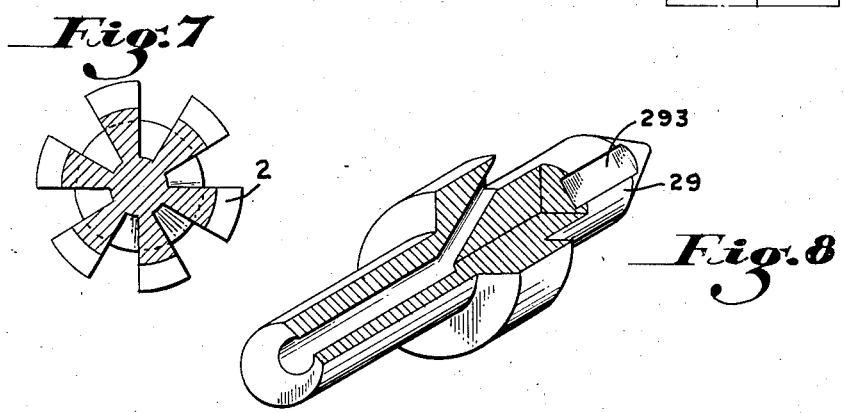
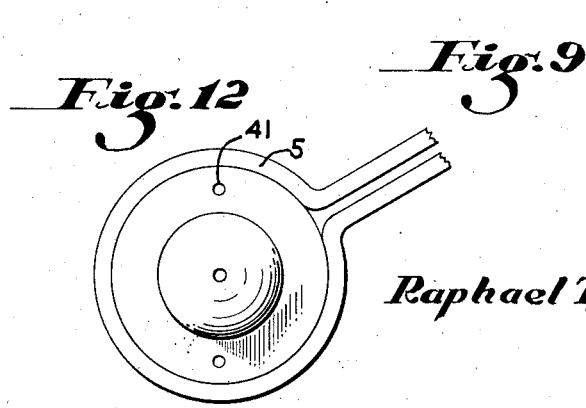
Raphael T. Coffman INVENTOR.
BY
*Paul B. Selb*
ATTORNEY Patented Apr. 4, 1944

2,345,917

UNITED STATES PATENT OFFICE 2,345,917

INJECTION MOLDING OF PLASTICS

Raphael T. Coffman, Arlington, N. J., assignor to E. I. du Pont de Nemours & Company, Wilmington, Del., a corporation of Delaware Application October 4, 1941, Serial No. 413,659

2 Claims. (Cl. 18—30)

This invention relates to the injection molding of plastics, especially to improvements in the molding apparatus. More particularly it appertains to nozzles which prevent the formation of hardened plugs or loss of substantial quantities of molding material during the time the nozzle is not connected with the mold.

In the injection molding of plastics, the molding compound is maintained in a plastic or fluid condition in a heating cylinder terminating in a nozzle whose orifice connects with a channel leading from the surface to the cavity in a mold block. The application of pressure upon the contents of the cylinder forces the softened molding composition through the aforementioned passages, filling the mold. When the article formed in the cavity has hardened, the mold, whose face usually matches and fits perfectly about the nozzle, is separated therefrom in order to clear the mold for another molding cycle.

Difficulty has always been encountered with the management of the softened material in the nozzle during the period of separation. If the nozzle is allowed to become cooled, the molding compound in the nozzle tends to harden, forming a plug which is a source of considerable trouble. If such cooling is prevented there is a tendency for the softened material to run out of the nozzle. Contact with the mold block, which generally is unheated and in many cases is chilled, with the nozzle during the time the molding compound is being injected, tends to lower the temperature of the nozzle. If this falls low enough, the molding composition stiffens, forming in the nozzle the aforementioned and more or less hard and solid plug of the plastic. When an empty mold is again brought into contact with the nozzle and injecting pressure applied for the molding of the next article, the plug is driven out ahead of the main body of the softened compound. In some cases it is possible to design the channel leading to the mold cavity in such a way that the hardened material is side-tracked, but in general the presence of the hard plug adds to the difficulty of the operation even when it does not actually cause defects in the molded articles.

The formation of a hard plug in the orifice can be prevented by supplying heat to the nozzle to keep it at a proper temperature, but when this is done the molding composition in the nozzle, which remains soft at all times, spews out when the mold is removed. This spewing is not only annoying in that it makes for untidiness, but it is also wasteful of material. When the material is of the type which needs merely to be made plastic in order to be made molded, the economic aspect is of minor importance, but when the molding compound is one which is substantially liquefied in the heating cylinder a major problem is involved.

The tendency to spew may be reduced somewhat by increasing the length of the passage within the nozzle, but this is an undesirable measure because of the increased frictional resistance encountered in transferring material through such narrow passages. In addition, if the temperature of the nozzle is unintentionally reduced too much, the length of the resulting solidified plug makes the problem of dealing with it disproportionately greater.

Another proposal to prevent spewing is the provision of a stop cock, but this adds an undesirable bulk to the nozzle, and as was the case with the elongated nozzle passage, too low a temperature inordinately complicates the problem of handling the resultant hard plug. Furthermore, from a practical standpoint, such a stop cock must be manually operated, in which case the otherwise automatic character of the operation is impaired and extra labor must be provided. Automatic operation of the stop cock has also been proposed, but this undesirably complicates the mechanism.

Another proposal for preventing spewing is a so-called "shut-off plate." This is a cover or stopper for the nozzle orifice which is slid into position as the mold block is pulled away. It has all the disadvantages of the stop cock whether actuated manually or mechanically, and in addition adds another moving part to an already complicated apparatus.

The foregoing résumé is believed to provide an adequate background for understanding the present invention, and it is considered unnecessary to review the various other plans which have been proposed for overcoming the problem set out above.

Perhaps it should be added that the foregoing difficulties and the deficiencies of the proposed means for obviating the same, are more pronounced when the molding compound is of a type which passes abruptly from a substantially liquid condition to a tough and relatively rigid solid condition, and vice versa. The recently developed synthetic linear polymers such as nylon are of this character, so the importance of finding a solution for the problem will be even more obvious.

The primary object of this invention was to prevent the spewing of molding compounds even when of liquid or substantially liquefied character, from injection molding apparatus nozzle orifices during the period of their separation from the mold block. Further objects were to provide an entirely automatic mechanical means requiring no actuation either by hand or by auxiliary mechanism for preventing the loss of molding composition during the period in which no mold is pressed against the extrusion nozzle; to provide a valve actuated by changes of pressure within the heating cylinder for closing the passageway through an injection molding machine nozzle; to positively and completely eliminate the formation of a hardened plug of molding compound in injection molding machine nozzles; to improve the uniformity and quality of plastic molded articles; to provide within an injection nozzle and without substantially increasing its bulk, a means for closing the passage therethrough when molding is not in progress; to make feasible the maintenance of the nozzle end of an injection cylinder at a temperature safely above that at which the composition being injected will stiffen; to make it possible to maintain the temperature of the softened molding material within the nozzle at a temperature above that of the same material within the cylinder of a molding machine; and to improve the quality of molded plastic articles by delaying the hardening of the first material which enters the mold cavity from the injection cylinder. A general advance in the art, and other objects which will appear hereinafter, are also contemplated.

It has now been found that the fluid molding composition in an injection molding machine nozzle can be prevented from spewing therefrom during the time that the nozzle is separated from a mold, by providing a valve opening and closing in the line of flow of the molding compound between the heating cylinder proper and the nozzle orifice. More specifically, it has been found that a valve plug, capable of closing the passage from the heating cylinder to the nozzle orifice, having a seating thrust opposite in direction to the net thrust of the molding pressure within said cylinder upon the said valve and less in magnitude than said net thrust, and actuated by a coiled spring, will prevent the loss of material from the molding machine nozzle between molding operations. By "net thrust" of molding pressure is meant the algebraic sum of the thrusts upon opposite ends of the valve plug delivered by the hydrostatic or pseudo-hydrostatic pressure of the softened molding compound, which pressure exists by reason of the application of molding pressure upon the contents of the heating cylinder.

How the foregoing objects and related ends are accomplished will be apparent from the following exposition, in which are disclosed the principle and divers embodiments of the invention, including the best mode contemplated for carrying out the same. The written description is amplified by the accompanying drawings, in which:

Figure 1 is a digrammatic axial cross-sectional view of the nozzle and adjacent portions of the injection molding apparatus of this invention;

Figure 2 is a perspective view, partly in section, of a strainer located in the extrusion nozzle;

Figures 3, 4 and 5 are perspective views of the valve seat (partly in section), the valve plug, and the spring which, together with the cooperating interior surfaces of the extrusion nozzle, constitute the valve of the present invention;

Figure 6 is a diagrammatic axial cross-sectional view containing a modified form of valve;

Figure 7 is a diagrammatic end view, partly in section, through the breaker or torpedo, taken on the line 7—7 of Figure 6;

Figure 8 is a perspective view, partly in section, of the valve plug for the valve shown in Figure 6;

Figure 9 is an end view of the valve plug of Figure 6;

Figures 10 and 11 are end views of the valve plug shown in Figures 1 and 4; and

Figure 12 is an end view of the extrusion nozzle and its heater ring.

Referring now to the drawings in detail, 1 indicates the outlet end portion of the heating cylinder of an injection plastic molding apparatus. Molding apparatus of this character is well known in the prior art, and it is believed unnecessary to burder this specification with details of the apparatus as a whole. A review of this field by Macht, Rahm and Paine appears in J. I. E. C. XXXIII 563–7 (May, 1941).

Within the cylinder there is located a breaker or torpedo 2, whose function, as is well known, is to improve the effectiveness of the heating of the molding compound in the cylinder. A nozzle bushing 3, threaded into the end of the heating cylinder, serves, together with the axial thrust of the molding compound under the pressure of the injection plunger, to position this breaker. The axial thrust tends to force the breaker out of the cylinder, and the bushing limits its movement. The breaker has radial slots permitting passage of the molding compound (see Figure 7). The end of the heating cylinder, or more exactly, the bushing in the end of the heating cylinder, is closed with a nozzle block 4 having a passage 42 communicating with a passage or sprue 61 in the front die block 6. The passage 61 communicates with the die cavity 71 in the rear die block 7. As will be clear from Figure 1, the nozzle 4 is shaped to fit tightly against the co-acting portion of the mold block 6.

The mechanism constituting the novel subject matter of the present invention is located within the nozzle block and, as shown in Figures 1, 2, 3, 4 and 5, comprises a strainer 8 having a plurality of small holes 81 about 0.030 to 0.060 of an inch in diameter, and a valve consisting of a valve seat 14, a valve plug 24 and a spring 34. The valve plug, like the breaker, has radial slots to permit passage of the molding compound while the plastic is being injected into the mold. The valve seat and strainer are positioned between the nozzle 4 and bushing 3, as shown in Figure 1. The spring fits about the reduced stem portion of the valve plug and exerts its pressure between the portion of the plug having the largest diameter and the interior surface of the nozzle just back of its orifice.

A heating coil 5, shown in Figures 1, 6 and 12, encircles a portion of the nozzle block which is reduced in diameter to accommodate the same. Wells 41, also shown in these same figures, are designed to accommodate thermocouples, thermometers, or other heat responsive devices.

In the modified form of the present invention shown in Figures 6 and 8, the valve plug operates in the opposite direction, seating on the interior of the exit end of the nozzle. A bushing 19 within the nozzle and resting against the strainer 8, positions and confines the spring 39. In this arrangement the valve plug is hollow for the greater part of its stem length to provide a channel for the material being extruded. This modification has two major advantages over the first modification, namely, the molding compound is not wilfully contacted with the spring, and the valve plug face is very close to the nozzle outlet orifice. A vent 93 in the nozzle communicates with the hole 193 in the bushing 19 to permit the escape of any molding material which may seep into the chamber 194 with the spring 39.

In operation of the device shown in Figure 1, an empty mold comprising die blocks 6 and 7 is positioned on or seated in contact with the nozzle, and by the application of pressure in the heating cylinder the molding material is forced past the breaker 2, through the strainer 8, into the bushing 14, opening the valve by forcing plug 24 in the direction of its travel, after which it passes through the radial slots in the valve plug, past the spring 34, through the passage 42 and channel 61, into the mold cavity 71. When the mold cavity has been filled, spring 34 forces the valve plug on to its seat, closing the passage through the nozzle and preventing the spewing or loss of molding compound through the passage 42.

In the device of Figure 6, the operation is generally similar, except for the action of the valve. In this case the molding compound to be injected passes from the strainer which prevents the passage of any improperly softened material of unsuitable dimension, through the bushing 19, into the channel 291 in the valve plug stem. This axial passage joins two ports 292 leading through the body portion of the valve plug which fits within the cavity in the nozzle block. The plastic passes through these ports into the annular cavity surrounding the reduced diameter portion of the plug 29, after which it enters the grooves 293 cut axially in the periphery of the plug. The hydrostatic or pseudo-hydrostatic pressure upon the fluid or semi-fluid molding compound within the nozzle block causes the valve plug to back away from its seat at the adit end of the passage 92, thereby opening a line of flow to the sprue 61 in the mold.

As was the case in the device of Figure 1 the plastic entering the strainer has passed from the cylinder cavity of the injection cylinder along the cylindrical portion of the breaker (which is of somewhat smaller diameter than the inside diameter of the cylinder), and through passageway formed by the grooves in the breaker head and the tapered or conical cavity of the bushing 8.

If there is assurance of the absence of unsoftened particles in the plastic mass passing the valve, the strainer member may obviously be omitted since its primary purpose is to cooperate with the valve by holding back any coarse, unsoftened particles which would tend to prevent the perfect seating of the valve plug in closed position. Obviously, as a temporary arrangement the strainer can be replaced by an annular ring to position the parts 14 or 19, or these parts and the nozzle piece may, as a permanent set-up, be redesigned to take care of the omission of the strainer.

It is believed clear that the device of Figure 1 will continue to deliver molding compound under pressure in quantities sufficient to compensate for shrinkage of the compound within the mold, or leakage at any of the various junctures where the molding compound might escape. This effectively ensures the complete filling of the mold cavity and the resultant production of articles freed from the effects commonly encountered due to shrinkage in, or incomplete filling of, the mold. So long as the mold pressure, usually in the order of 2,000 pounds or more per square inch, exists in the apparatus, the valve mechanism operates automatically to this end, but when the mold is filled and the pressure built up therein corresponds to that in the injection cylinder, there is no longer a differential of pressure in opposition to the thrust of the spring 34 whereupon it causes seating of the valve plug. In the next phase of the molding cycle, the pressure is released from the contents of the heating cylinder and the mold block pulled away from contact with the convex surface about the nozzle 42. Since there is no pressure upon the molding compound within the cylinder and the valve plug is seated, the softened molding compound is effectively sealed within the cylinder and cannot leak out through the nozzle passage. The simple straight wall tubular hole terminating the orifice 42 may, if desired, take a special form in which a zone of minimum diameter is located at the point at which it is desired to break the line or stream of molding compound as the mold is pulled away from its contact with the nozzle block for the purpose of removing the molded article. Preferably the break is at or near the junction of the mold and the nozzle.

In order that the valve plug illustrated in Figure 6 shall act in the desired manner, it is necessary that a thrust be developed in opposition to that of the coiled spring 39. This is accomplished by so designing and proportioning the parts of the plug that the area receiving a hydrostatic or pseudo-hydrostatic thrust in opposition to the thrust of the spring shall be greater than the area receiving the same hydrostatic thrust, per unit of area, in the opposite sense. Although Figure 6 is not to scale, having been exaggerated in certain particulars for the purpose of clarity, it is believed evident that the annular area of the body portion of the plug beyond the periphery of the seat portion plus the extensions of this annular or disc-like face exposed by the grooves 293, which total area receives a hydrostatic or pseudo-hydrostatic pressure from the molding compound in opposition to the thrust of the coiled spring 39, is of greater area than the sum of those surfaces of the valve plug which receive the pressure tending to reinforce the thrust of the spring. It is also believed evident that once the closed contact of the plug and its seat has been broken, the resulting exposure of the seating surface of the plug adds much more to the area which is receiving a thrust in opposition to the spring. Release of the pressure in the injecting cylinder allows the plug to close the line of flow of the molding compound, thereby producing the same desirable results described in connection with the valve illustrated in Figure 1.

Equivalent means for the springs in actuating the valve plugs may be utilized when desired.

The mechanism of this invention eliminates the spewing of the softened molding compound from the nozzle during that part of the cycle of operation when the nozzle is not sealed by contact with the mold block, and accomplishes this result completely automatically because it is actuated by changes of pressure upon the molding compound in the system, thereby eliminating the need for either manual or external mechanical means of operation. The prevention of spewing does away with a source of annoyance which has been particularly troublesome in the molding of plastics which become liquid, or nearly so, at the optimum temperature of molding. As a result, it is no longer necessary to limit the temperature of the nozzle for the same purpose. With the present invention there is no reason to have the temperature at the nozzle so low that the molding compound hardens in the nozzle between successive injections, and it is feasible to maintain the nozzle at a temperature even higher than that of the heating cylinder, when desired. Such a higher temperature is often desirable because it delays solidification of the plastic when it strikes the unheated surface of the mold, ahead of the bulk of the charge, thereby enhancing both the smoothness of the loading of the mold and the quality or structural homogeneity of the molded article.

The apparatus of the present invention is particularly adapted to handle polyhexamethylene adipamide and like fiber-forming synthetic linear condensation polymers, such as those described in U. S. A. Patents Nos. 2,071,251, 2,071,253, 2,130,523 and 2,130,948 to Carothers, which pass rather abruptly from liquid to solid condition, and vice versa. The high temperature of the nozzle resulting from the heating means exemplified by the band heater close to the nozzle passage, prevents the cooling and subsequent formation of hard plugs, which are particularly troublesome because of their rigidity, in the nozzle.

If the design and construction of the nozzle and enclosed valve favor a generous transfer of heat from the nozzle to the heating cylinder, it may not be necessary to employ the nozzle heater in order to improve both the operation of filling the mold cavity and the uniformity of the molded article.

In addition to the advantages accruing to the present invention with plastics which are quite fluid or liquid under optimum injection molding conditions, the present invention tends to minimize contact of the hot plastic with air, thereby restraining the physical and chemical changes which bring about discoloration.

In actual practice the simplicity of the device of Figure 1 will be balanced against certain more desirable features, namely, the closing of a line of plastic flow near the nozzle opening and source of heat at or near this point and the location of the coiled spring so that it does not present an obstacle in the way of the line of flow of the molding compound, in the device of Figure 6.

As many apparently widely different embodiments of this invention may be made without departing from the spirit and scope thereof, it is to be understood that this invention is not limited to the specific embodiments thereof except as defined in the appended claims.

I claim:

1. An injection molding machine comprising a heating cylinder from which heated plastic to be injected into a mold is forced, a nozzle block in communication with the exit end of said heating cylinder, and a valve mounted in said nozzle block, said valve comprising a valve seat, a valve plug movable in a direction parallel to the direction of flow of plastic through said nozzle block and positioned on the side of said valve seat adjacent the exit end of said nozzle block, and spring means applying a seating thrust on said plug opposite in direction to the flow of plastic through said nozzle block, said seating thrust being less than the thrust of plastic forced from said heating cylinder.

2. An injection molding machine comprising a heating cylinder from which heated plastic to be injected into a mold is forced, a bushing carried by said heating cylinder at the exit end thereof, a nozzle block carried by said bushing at the exit end thereof, said bushing being provided with a central passage communicating from the exit end of said heating cylinder to said nozzle block, a valve mounted in said nozzle block, said valve comprising a valve seat, a valve plug movable in a direction parallel to the direction of flow of plastic through said nozzle block and positioned on the side of said valve seat adjacent the exit end of said nozzle block and a coiled spring applying a seating thrust on said valve plug opposite in direction to the flow of plastic through said nozzle block, said seating thrust being less than the thrust of plastic forced from said heating cylinder, and heating means carried by said nozzle block for heating plastic contained in the passage through said nozzle block.

RAPHAEL T. COFFMAN.